United States Patent [19]

Speich

[11] Patent Number: 4,641,875
[45] Date of Patent: Feb. 10, 1987

[54] DEVICE FOR THE CONNECTION OF COMPONENTS AND TENSIONING AND/OR CONTROL DEVICES WITH BELTS

[75] Inventor: Herrn H. Speich, Hüttlingen, Fed. Rep. of Germany

[73] Assignee: RUD-Kettenfabrik Rieger & Dietz GmbH u. Co., Fed. Rep. of Germany

[21] Appl. No.: 677,164

[22] Filed: Dec. 3, 1984

[30] Foreign Application Priority Data

Dec. 6, 1983 [DE] Fed. Rep. of Germany ....... 3344485

[51] Int. Cl.⁴ .................... A44B 11/00; B66C 1/10
[52] U.S. Cl. .................................. 294/82.11; 24/197
[58] Field of Search ............... 294/74, 82.1–82.14; 24/68 A, 68 CD, 68 D, 68 E, 68 F, 68 PP, 115 R, 115 K, 136 R, 136 K, 165, 168, 171, 182, 185, 193–200, 265 R, 265 CD, 265 BC, 265 EC, 265 H, 230.5 R

[56] References Cited

U.S. PATENT DOCUMENTS

| Re. 30,307 | 6/1980 | Arbogast ................. 410/37 |
| 491,449 | 2/1893 | Simmons ................. 24/165 |
| 814,024 | 3/1906 | Cue . |
| 2,710,436 | 6/1955 | Davis ................. 24/68 CD |
| 2,993,680 | 7/1961 | Davis . |
| 2,998,625 | 9/1961 | Huber ................. 24/193 X |
| 3,120,403 | 2/1964 | Molzan et al. ............. 294/82.11 X |
| 3,131,450 | 5/1964 | Zinkel ................. 24/197 |
| 3,175,806 | 3/1965 | Prete, Jr. . |
| 3,749,366 | 7/1973 | Brucker . |
| 3,804,368 | 4/1974 | Bailey . |
| 3,826,473 | 7/1974 | Huber . |
| 3,895,539 | 7/1975 | Weman et al. ............. 74/575 |
| 4,185,360 | 1/1980 | Prete, Jr. et al. . |
| 4,199,182 | 4/1980 | Sunesson . |
| 4,227,286 | 10/1980 | Holmberg . |
| 4,324,022 | 4/1982 | Prete, Jr. . |
| 4,365,391 | 12/1982 | Chapalain ............. 24/197 |
| 4,422,218 | 12/1983 | Brasseux . |
| 4,493,135 | 1/1985 | Crook ................. 24/197 |

FOREIGN PATENT DOCUMENTS 579154 7/1958 Italy .

Primary Examiner—Johnny D. Cherry
Attorney, Agent, or Firm—Mark P. Stone

[57] ABSTRACT

In a device for the connection of components to belts, two cross-members serve for the connection of a belt, of which at least one is mounted detachably in a side wall of the device, the side walls being mutually connected by belt guide bars. The cross-members have a circular segment-shaped cross-section and have mutually facing straight surfaces which delimit a belt guide slot.

14 Claims, 6 Drawing Figures

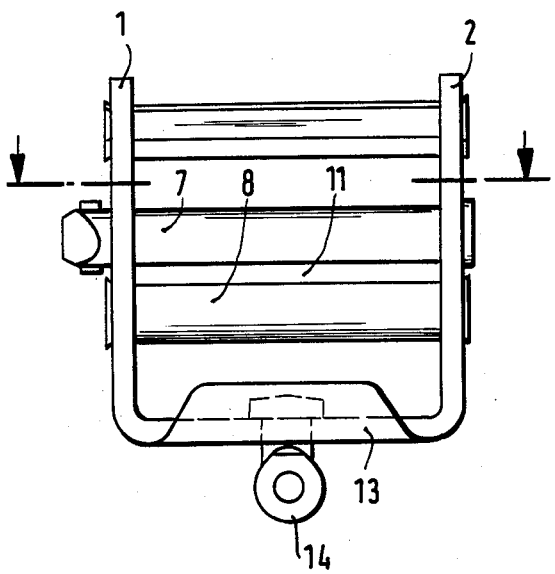
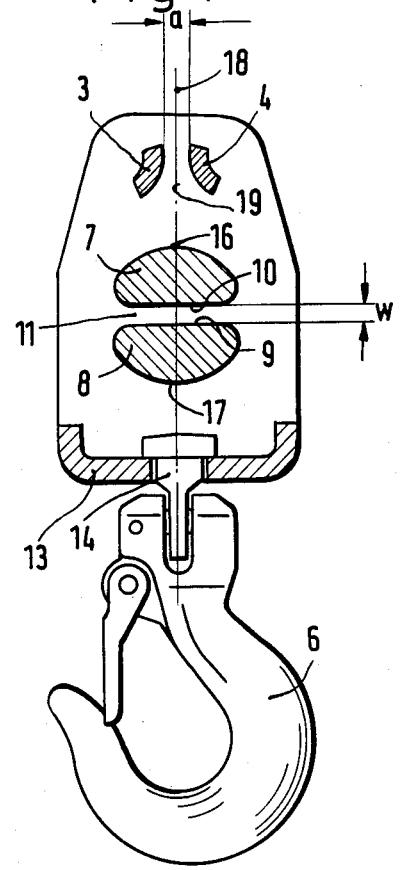
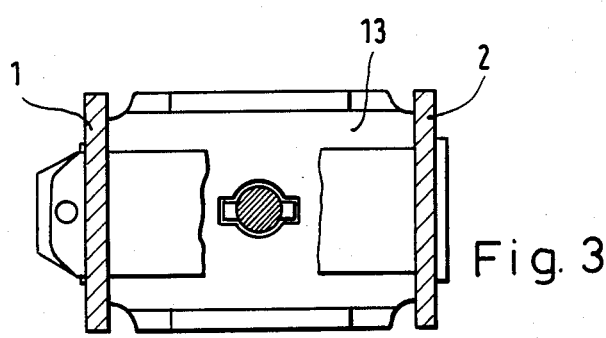

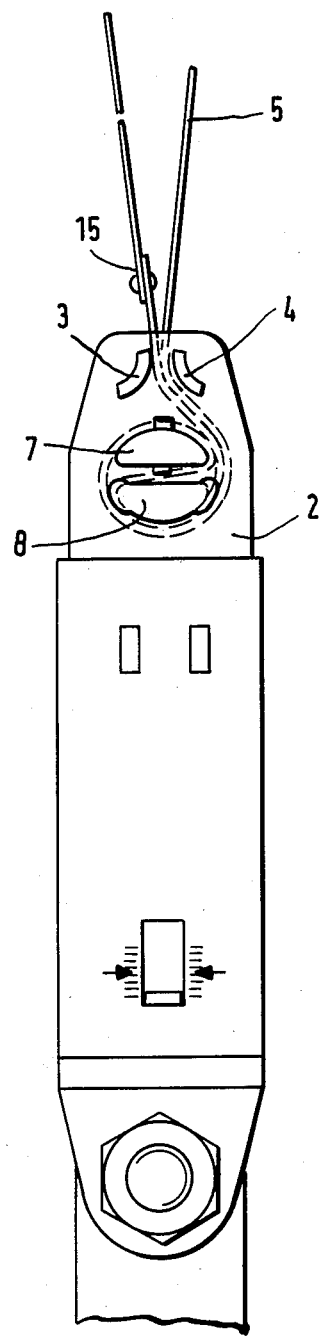

DEVICE FOR THE CONNECTION OF COMPONENTS AND TENSIONING AND/OR CONTROL DEVICES WITH BELTS

BACKGROUND OF THE INVENTION

The invention relates to a device for the connection of components—such as hooks, eyes, shackles, chain links or the like—and of tensioning and/or control devices of hoisting and/or lashing arrangements with belts.

A device of the abovementioned type is known from U.S. Pat. No. 4,199,182. In the known device the side walls of a belt ratchet are mutually connected on the one hand by a screw bolt and on the other hand by a cross-member which is arranged at an interval from the screw bolt and exhibits a circular segment-shaped cross-section. The known device cannot be fully satisfactory for several reasons. A first reason is that, due to the use of a cylindrical screw bolt, the strength of the connection of the belt to the belt ratchet is unsatisfactory. Problems may arise particularly if the belt is relieved intermittently. Another disadvantage found in the known device is the fact that the belt does not leave it at a precisely defined point. This may also lead, under unfavourable conditions, to an impairment of the strength of the connection between the belt and the device.

SUMMARY OF THE INVENTION

The underlying object of the invention is to produce a device of the type considered which is easy to manipulate, that is to say particularly permits rapid connection of a belt, and which furthermore ensures reliable seating of the belt.

This object is achieved according to the invention in that the device comprises two side walls, connected by belt guide bars, and two cross-members of circular segment-shaped cross-section, the mutually facing straight surfaces of which delimit a belt guide slot, and of which at least the cross-member facing the belt guide bars is mounted detachably in circular segment-shaped holes arranged mutually aligned in the side walls.

The device according to the invention presents the advantage that a high degree of wrap of the cross-members used for fastening the belt can be ensured. They are simple to manipulate and the connection and release of a belt can proceed very rapidly.

BRIEF DESCRIPTION OF THE DRAWING

The invention is explained more fully below with reference to the accompanying drawing, wherein:

FIG. 1 shows a section through a device;
FIG. 2 shows a side elevation of the device according to FIG. 1;
FIG. 3 shows a plan of the device according to FIGS. 1 and 2;
FIG. 5 shows a belt fully introduced into a device according to FIGS. 1-3 and
FIG. 6 shows the arrangement of a device on a control device for the belt tension.

DESCRIPTION OF THE PREFERRED EMBODIMENT

Figure 4:
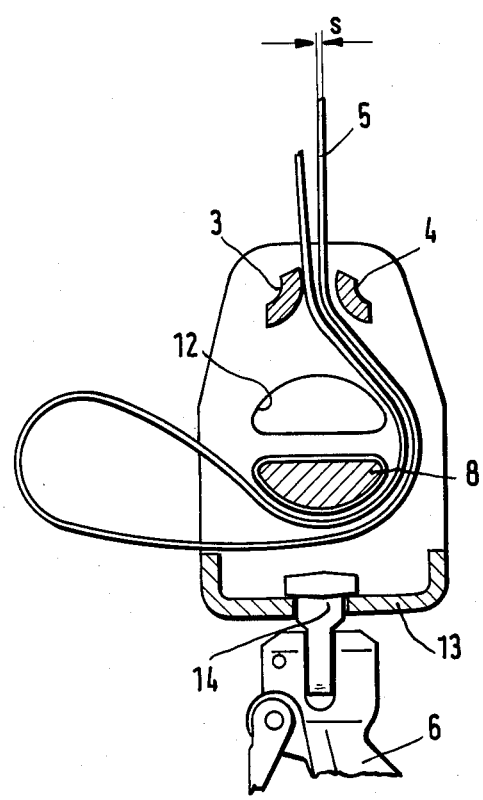
FIG. 4 shows the introduction of a belt into a device according to FIGS. 1-3.

In FIGS. 1-5, 1 and 2 designate two side walls, connected by two belt guide bars 3 and 4, of a device for connecting a belt 5 to a component 6 formed by a hook. The side walls 1 and 2 are additionally bridged by two cross-members 7 and 8, of which at least the cross-member (7) facing the belt guide bars is mounted detachably in the side walls. The cross-members have a circular segment-shaped cross-section. Their mutually facing straight surfaces 9 and 10 delimit a belt guide slot 11, the width w of which is substantially equal to twice the thickness s of the belt 5 to be connected. Holes 12 serve to accommodate the cross-members in the side walls.

The side walls 1 and 2 are mutually connected not only by the belt guide bars 3 and 4, but additionally via a yoke 13. A swivel 14 for the component 6 is also mounted rotatably in this yoke 13.

The interval a between the belt guide bars 3 and 4 is greater than twice the thickness s of the belt 5, but smaller than the thickness A of a safety stop 15 which is arranged at the end of the belt 5 and is preferably formed by an identification plate for the belt, which is attached to the free end of the belt after the belt 5 has been connected to the device.

The arrangement of the belt guide bars 3 and 4 and of the cross-members 7 and 8 is made so that the summits 16 and 17 of the cross-sections of the cross-members 7 and 8 lie on a line 18 which passes through the center of the guide gap 19 delimited by the belt guide bars 3 and 4.

Figure 5:
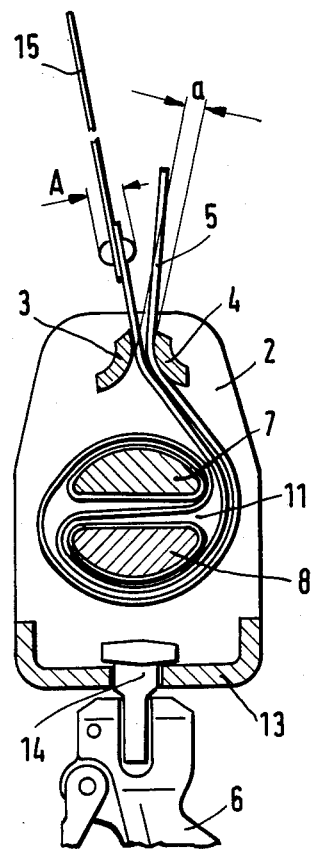

As may be seen from FIGS. 1, 4 and 5, the belt guide bars are provided with curved belt guide surfaces which exclude any damage to the belt in the region of the belt guide bars.

FIG. 6 shows a control means for the pretensioning force of a belt 5, which means is equipped with a device which corresponds largely to the device described in FIGS. 1-5. The same reference numerals have been used in this figure for identical parts.

I claim:

1. A device for the connection of components-such as hooks, eyes, shackles, or chain links-with belts (5) which device comprises two cross-members (7,8) disposed one behind the other between two side walls (1,2), one (7) of which cross-members (7,8) supports with part of its circumference a single belt layer formed by a closed loop and the other (8) of which supports with part of its circumference a double belt layer formed by an open loop, and of which cross-members (7,8) at least that one (7) which supports the single belt layer is mounted detachably in holes (12) arranged mutually aligned in the side walls (1,2), wherein both cross-members (7,8) are of circular segment-shaped cross-section and provided with mutually facing straight surfaces (9,10) which delimit a belt guide slot (11) the width (w) of which is substantially equal to twice the thickness (s) of a belt (5) to be connected.

2. A device as claimed in claim 1 wherein the side walls (1,2) are mutually connected by a yoke (13) and by two belt guide bars (3,4) arranged at an interval from the latter.

3. A device as claimed in claim 2, wherein the belt guide bars (3,4) form a guide gap (19) for passing a belt (5) therethrough.

4. A device as claimed in claim 3, wherein summits (16,17) defined on the cross-sections of the cross-members (7,8) are located on a line (18) which passes through the center of the guide gap (19) delimited by the belt guide bars (3,4).

5. A device as claimed in claim 4, wherein the belt guide bars (3,4) are provided with curved guide surfaces.

6. A device as claimed in claim 3 further including a belt having at least one free end passing through said guide gap (19) and a safety stop attached to said at least one free end, wherein the interval (a) between the belt guide bars (3,4) is greater than twice the thickness of said belt and smaller than the thickness (A) of said safety stop at the belt's free end.

7. A device as claimed in claim 6, wherein the safety stop is formed by a part of an identification plate (15).

8. A device for the connection of tensioning or control devices of hoisting or lashing arrangements with belts (5) which device comprises two cross-members (7,8) disposed one behind the other between two side walls (1,2), one (7) of which cross-members (7,8) supports with part of its circumference a single belt layer formed by a closed loop and the other (8) of which supports with part of its circumference a double belt layer formed by an open loop, and of which cross-members (7,8) at least that one (7) which supports the single belt layer is mounted detachably in holes (12) arranged mutually aligned in the side walls (1,2), wherein both cross-members (7,8) are of circular segment-shaped cross-section and provided with mutually facing straight surfaces (9,10) which delimit a belt guide slot (11) the width (w) of which is substantially equal to twice the thickness (s) of a belt (5) to be connected.

9. A device as claimed in claim 8, wherein the side walls (1,2) are mutually connected by a yoke (13) and by two belt guide bars (3,4) arranged at an interval from the latter.

10. A device as claimed in claim 9, wherein the belt guide bars (3,4) form a guide gap (19) for passing a belt (5) therethrough.

11. A device as claimed in claim 10, wherein summits (16,17) defined on the cross-sections of the cross-members (7,8) are located on a line (18) which passes through the center of the guide gap (19) delimited by the belt guide bars (3,4).

12. A device as claimed in claim 11, wherein the belt guide bars (3,4) are provided with curved guide surfaces.

13. A device as claimed in claim 10 further including a belt having at least one free end passing through said guide gap (19) and a safety stop attached to said at least one free end, wherein the interval (a) between the belt guide bars (3,4) is greater than twice the thickness of said belt and smaller than the thickness (A) of said safety stop at the belt's free end.

14. A device as claimed in claim 13 wherein the safety stop is formed by a part of an identification plate (15).

* * * * *